US005354246A

United States Patent [19]

Gotman

[11] Patent Number: 5,354,246
[45] Date of Patent: * Oct. 11, 1994

[54] MECHANISM IN A POWERED HAND-HELD ROTARY DRIVER FOR COUNTERACTING REACTION TORQUE

[75] Inventor: Alexander S. Gotman, Santa Monica, Calif.

[73] Assignee: Gene W. Arant, Santa Paula, Calif.; a part interest

[ * ] Notice: The portion of the term of this patent subsequent to Aug. 24, 2010 has been disclaimed.

[21] Appl. No.: 24,432

[22] Filed: Mar. 1, 1993

Related U.S. Application Data

[63] Continuation of Ser. No. 653,682, Feb. 11, 1991, Pat. No. 5,238,461.

[51] Int. Cl.[5] .................................... F16H 1/42
[52] U.S. Cl. .................................... 475/248; 475/332; 81/57.31; 81/56
[58] Field of Search .................... 475/248, 331, 332; 74/665 G, 665 GA; 81/55, 56, 57.31

[56] References Cited

U.S. PATENT DOCUMENTS

| | | | |
|---|---|---|---|
| 2,228,638 | 1/1941 | Mercier | 475/248 X |
| 2,322,247 | 6/1943 | Mercier | 475/248 |
| 3,323,395 | 6/1967 | Burnett et al. | 81/55 |
| 3,331,269 | 7/1967 | Sauter | 81/56 |
| 3,646,834 | 3/1972 | Davis | 74/665 GA X |
| 4,964,315 | 10/1990 | Willis, Jr. | 74/665 GA |
| 4,976,669 | 12/1990 | Jones | 475/332 X |
| 5,009,621 | 4/1991 | Bankstahl et al. | 475/248 X |
| 5,161,437 | 11/1992 | Vasutomi et al. | 81/56 X |
| 5,238,461 | 8/1993 | Gotman | 475/248 |

FOREIGN PATENT DOCUMENTS

| | | | |
|---|---|---|---|
| 421889 | 12/1934 | United Kingdom | 475/248 |
| 603144 | 6/1948 | United Kingdom | 475/248 |

*Primary Examiner*—Leslie A. Braun
*Assistant Examiner*—Khoi Q. Ta
*Attorney, Agent, or Firm*—Gene W. Arant

[57] ABSTRACT

A powered hand-held rotary tool adapted for preventing an externally manifested reaction torque upon the hand of an operator consists of a housing, a rotor adapted to be driven for rotation relative to the housing, and a planetary differential mechanism having a sun gear coaxial with and driven from the rotor, planetary gears, and a ring gear. The ring gear is rotatable relative to the housing. A first output gear is coaxial with the sun gear and rotatably driven by the planetary gears. An additional output gearing is rotatably supported from the housing on an axis that is laterally offset from the axis of the rotor, and is drivingly engaged by the ring gear. Rotation of the additional gearing in one direction relative to the housing is inhibited.

17 Claims, 2 Drawing Sheets

T1 = 24, 32
T2 = 36, 38, 40
T3 = 42
T4 = 64, 60
T5 = 57, 55
T6 = 10, 13, 14, 15

MECHANISM IN A POWERED HAND-HELD ROTARY DRIVER FOR COUNTERACTING REACTION TORQUE

RELATED APPLICATION

This application is a continuation of my application Ser. No. 07/653,682 filed Feb. 11, 1991, now U.S. Pat. No. 5,238,461.

BACKGROUND OF THE INVENTION

Differential rotary drivers for tightening threaded fasteners having means at the threaded end of the bolt or pin to be drivingly engaged with a driver or the like have been well known though not extensively used. Such machines typically have two concentric output shafts which rotate concurrently in opposite directions. Such machines are shown, for example, U.S. Pat. No. 2,928,302 issued in 1960 to Owen et al, entitled "MEANS FOR ACHIEVING A PREDETERMINED EXTENT OF LOADING IN TIGHTENING UP NUTS ON BOLTS AND STUDS"; in U.S. Pat. No. 3,041,902 issued in 1962 to Wing, entitled "MOTOR OPERATED HAND TOOL FOR SETTING FASTENERS"; and in U.S. Pat. No. 3,331,269 issued in 1967 to Sauter, entitled "DRIVING GUN".

All of the machines shown in those prior patents were portable, and the hand of the operator supported the housing or stator of a primary driver within which a power input shaft or rotor was drivingly rotated. In all of those machines both output shafts were coaxial to the power input shaft. One output shaft could be said to rotate in the clockwise direction while the other could be said to rotate in the counterclockwise direction. The clockwise output shaft would create a reaction torque to the operator of the machine in a counterclockwise direction and the counterclockwise output shaft would create a reaction torque to the operator in the opposite or clockwise direction.

It may have been a design objective of such machines to equalize those two reaction torques so that there would then be no net reaction torque experienced by the operator. This was clearly implied in the Sauter patent which stated at Col. 3, lines 56-60:

> ". . . these torques may be equal so that there is no torque upon the operator holding the driving gun 10. In the present gun there is a slight amount of such torque due to the speed reducing effects of sun gear 66, planet gears 74 and 76 and ring gear 84."

However, Sauter's machine failed to eliminate the reaction torque. Sauter's explanation of the problem was also wrong, because in the type of machine shown by Sauter it was both theoretically and practically impossible to eliminate the reaction torque imposed upon the hand of the operator. The machines described in the Owen et al patent and in the Wing patent also failed to eliminate reaction torque imposed upon operator, and for the same reason.

Recent medical research has shown that operators of power drivers and the like, who experience reaction torque on a regular basis, are prone to chronic and serious ailments of the hand. Hence it is indeed important to eliminate this problem.

Another very desirable design objective for a differential rotary drive machine, but which the machines shown in the three patents described did not meet, is the establishment of optimum driving torques for the two output shafts.

Thus the present invention deals with eliminating the reaction torque experienced by the operator, and at the same time optimizing the driving torques of the two output shafts.

SUMMARY OF THE INVENTION

According to the present invention a powered hand-held rotary tool is adapted for minimizing or preventing an externally manifested reaction torque upon the hand of an operator. The tool consists of a housing, a rotor supported for rotation relative to the housing, and a planetary differential mechanism having a sun gear coaxial with the rotor, planetary gears, and a ring gear. The tool is characterized by the fact that the ring gear rather than being fixed to the housing is supported for rotation relative to the housing. A first output gear is coaxial with the sun gear and is rotatably driven by the planetary gears. An additional output gearing is rotatably supported from the housing on an axis that is laterally offset from the axis of the rotor, and is drivingly engaged by the ring gear. The rotation of the additional gearing relative to the housing is inhibited.

When rotary power is applied between the housing and the rotor, an operator holding the housing experiences no reaction torque.

Thus the object of the present invention is to provide a rotary driver which reduces or eliminates any reaction torque that would be imposed upon the hand of the operator.

DRAWING SUMMARY

DETAILED DESCRIPTION OF FIGS. 1 AND 2

Figures 1, 3:
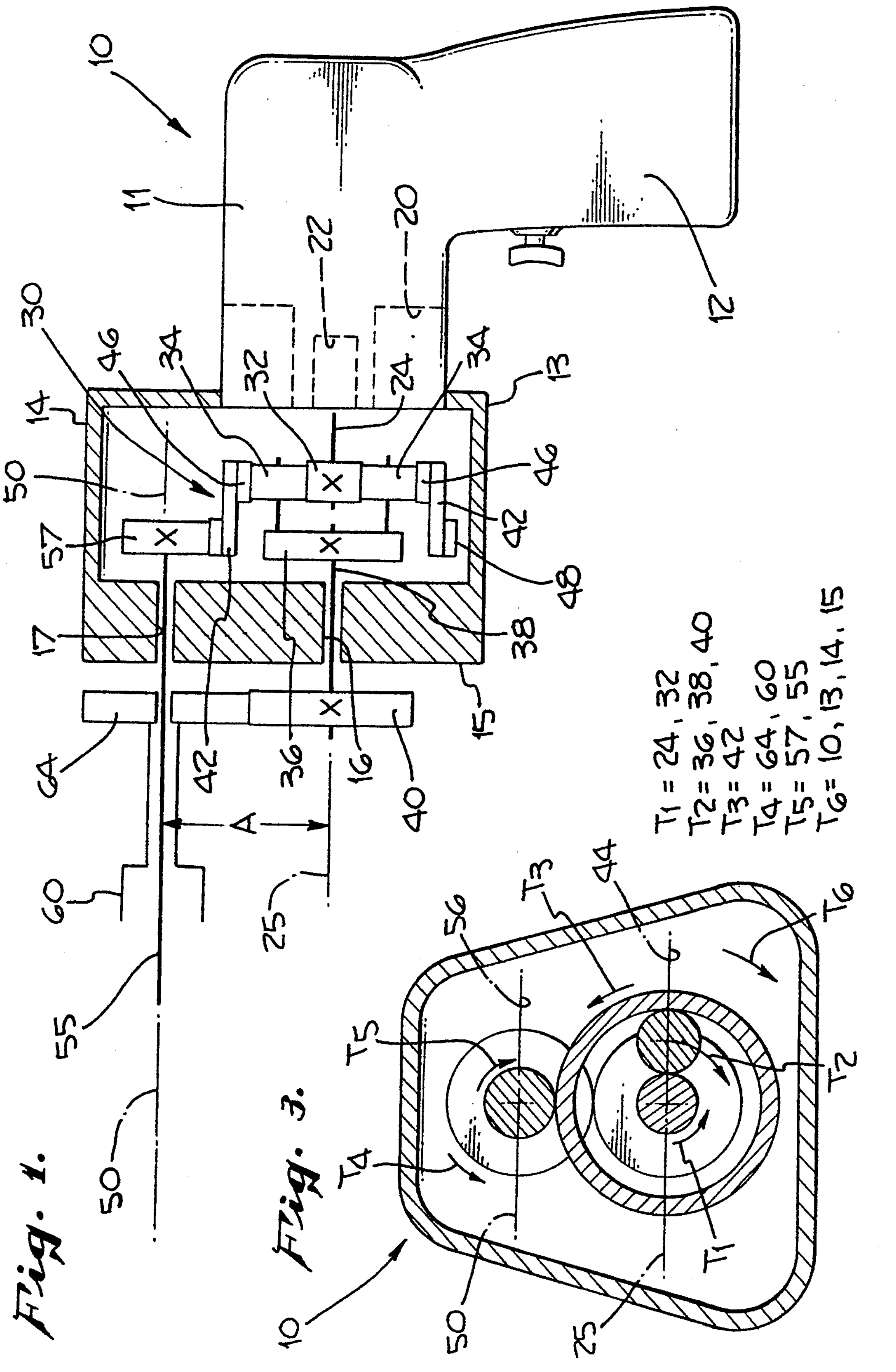
FIG. 1 is a schematic side elevation view of a hand tool in accordance with the present invention.
FIG. 3 is a schematic transverse cross-sectional view of the mechanism of FIG. 1 showing both operating and reaction torques which exist in the interior of the mechanism.

As shown schematically in FIG. 1 the present invention includes a housing 10 having a main or driving portion 11, a pistol grip handle 12, and a forward portion 13. The forward portion 13 has an upward extension 14. The driving portion 11 and pistol grip handle 12 are shown in solid lines while the forward portion 13, 14, is shown in cross-section. Within the driving portion 11 of the housing a stator 20 and rotor 22 of a primary driver are shown in dotted lines. A power input shaft 24 is fixedly attached to rotor 22 and extends into forward housing portion 13.

A differential gear mechanism is arranged coaxial to the power input shaft, supported for rotation within the forward housing 13, and has two output gears with mutually opposite rotations. Specifically, the differential mechanism 30 includes a sun gear 32 attached to the forward end of power input shaft 24 in a fixed and non-rotatable relationship as indicated by symbol "x". Surrounding the sun gear 32 is a set of planetary gears 34 which rotate about the sun gear 32 on respective shafts of a cage 36. From the output of the cage 36 there extends an output extension shaft 38 in a fixed and non-rotatable relationship as indicated by symbol "x". Extension shaft 38 on its forward end carries a first output gear 40. A ring gear 42 is rotatably supported inside the housing portion 13. The ring gear has inner teeth 46 which are engaged by planetary gears 34, and outer teeth 48 which act as a second output gear. The forward wall 15 of the housing portion 13, 14 has a first opening 16 which is coaxial with power input shaft 24 and through which the extension shaft 38 passes, being rotatably supported in the opening 16. The axis of power input shaft 24 and extension shaft 38 is designated as 25.

Wall 15 also extends upward and forms a part of the housing upward extension 14 where it has a second and upper opening 17, laterally displaced in the upward direction from power input shafts 24, 38. A central output shaft 55 is rotatably supported in the second opening 17, and thus is laterally offset relative to the axis of the power input shaft 24 and the output extension shaft 38. A first input gear 57 is fixedly attached to the rearward end of output shaft 55 and is drivingly engaged by the outer teeth 48 of ring gear 42, i.e., the second output gear. A circumferential output shaft 60 concentrically surrounds the central output shaft 55 and is rotatably supported thereon. Its rearward end is fixedly attached to a second input gear 64, which in turn is drivingly engaged by first output gear 40. Thus the two output shafts have input gears which are driven by corresponding output gears of the differential mechanism. The axis of output shafts 55, 60, is designated as 50. Axis 50 is laterally offset or displaced from axis 25 by a distance A.

Figures 2, 4:
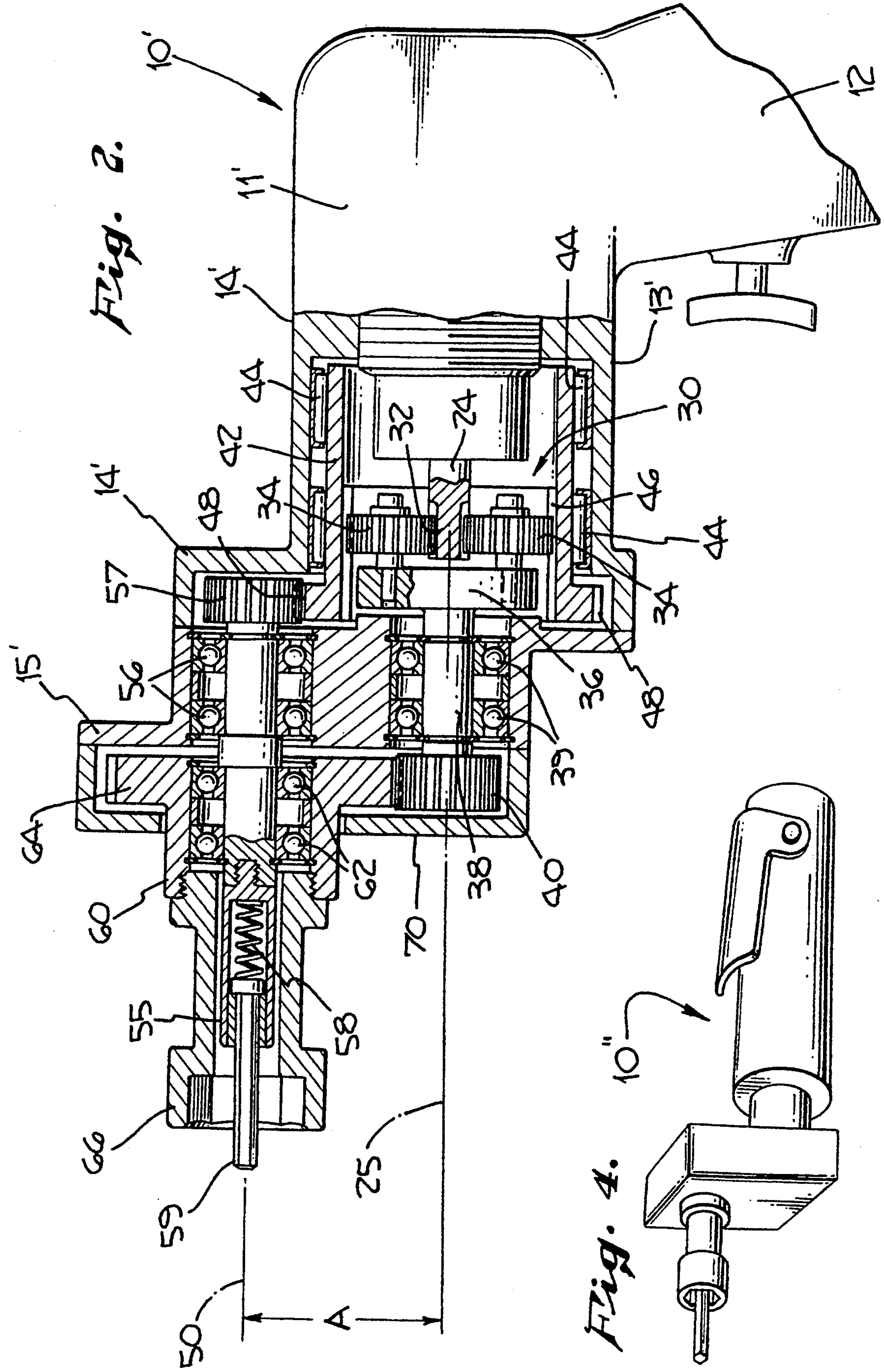
FIG. 2 is a side elevation view of the hand tool FIG. 1, shown partly in cross-section to expose the internal parts in some detail.
FIG. 4 shows an alternate form of housing in accordance with the invention.

Although the schematic representation of FIG. 1 will be well understood by those skilled in the art, the actual mechanical details of one preferred embodiment are shown in FIG. 2. Some of the corresponding parts shown in FIG. 2 are modified somewhat, and the reference number then bears a prime ′.

As shown in FIG. 2, the differential rotary drive tool of the present invention includes a housing 10′ having a downwardly depending pistol grip handle 12, and containing a primary driver whose output is provided on a power input shaft 24. The driver may be powered by an air motor, an electric motor, or other means not shown. The axis of power input shaft 24 is designated by numeral 25. The differential gear mechanism 30 is coaxial with that axis. An independent axis 50 that is laterally offset from the axis 25 extends through the housing extension portion 14′. While the differential gear mechanism may have one, two, or more stages, in the presently preferred embodiment of the invention there is only a single stage.

The forward end of ring gear 42 has an enlarged extension 48 forming an externally toothed gear, which is a second output gear of the differential mechanism. Spur gear 40 and ring gear 42 are both coaxial with the axis 25 of power input shaft 24, and are rotatable in mutually opposite directions.

Bearings necessary for support of the rotating parts are also shown in FIG. 2. Power input shaft 24 is supported by bearings within housing portion 11′ (not specifically shown). The main portion of ring gear 42 (not including external teeth 48) is rotatably supported within housing portion 13′ by means of bearings 44. Extension shaft 38 is supported from housing wall 15′ by bearings 39. Central output shaft 55 driven by spur gear 57 is supported in housing wall 15′ by bearings 56. And circumferential output shaft 60 is supported from central output shaft 55 by bearings 62. Thus, both of the output shafts 55 and 60 are rotatably supported from the crank or extension portion 14′, 15′ of housing 10′ by means of the bearings 62, 56, and are coaxial with the laterally displaced axis 50.

A housing front cover 70 is removably attached to housing portion 15′ in order to protect the teeth of output gear 40 and input gear 64. Another feature of modular construction is that the housing portion 15′ which contains bearings 39, 56, and shafts 38, 55 is removably attached to the housing portion 14′.

It is significant that the housing 10′ is a rigid structure which essentially provides a crank arm of length A between the axes 25 and 50. While the actual or relative value of the distance A may be varied as a design parameter, its existence is indispensable to the present invention. That is to say, the important function of the tool in eliminating the reaction torque imposed upon the operator is dependent upon the fact that output shaft 55 and its axis 50 is, laterally offset from input shaft 24 and output extension shaft 38, and their axis 25, being rotatably supported from the same housing. In one presently preferred embodiment of the invention as shown in FIGS. 1 and 2 the output shafts 55, 60, are arranged precisely parallel to the power input shaft 24 and output extension shaft 38, or substantially so.

Output shaft 60 is formed integral with input gear 64 and carries a box or socket wrench 66 for engaging the nut or collar. Central output shaft 55 carries an allen wrench 59 adapted to be received in the wrench opening of the bolt or pin of a fastener. A spring 58 which occupies the hollow forward end of shaft 55 resiliently supports the allen wrench 59 to permit it to have axial movement relative to the shaft. The allen wrench 59 and the box or socket wrench 66 are adapted to be applied concurrently to a fastener, not shown, in a manner that is well known in the art. It will be understood that wrenches 59 and 66 are merely illustrative and that if desired other means of engagement may instead be used on the ends of output shafts 55 and 60.

It will be understood that the output drives that are provided on the output gears 40, 48, of the differential gear mechanism necessarily provide different gear ratios relative to the rotation rate of the power input shaft 24. The gear trains consisting of gears 40, 64, and 48, 57, make possible a selection of different gear ratios and hence of different output torques to be separately and simultaneously applied to the bolt and nut of a fastener. Where an allen wrench is used on the central output shaft, the ratio of the output torque of circumferential shaft 60 to the output torque of central output shaft 55 should preferably be at least 2:1, and about 4:1.

From a reading of the three prior patents listed above it appears that there was an inadequate understanding of the importance of optimizing the ratio of output torques. The present invention is based in part upon a recognition of the fact that there is a maximum value of torque loading which should be applied to the bolt or pin, and that there is also a maximum value of torque loading which should be applied to the nut or collar. Based on these maximum values my calculations have shown that where an allen wrench is used on the central shaft the output torque of the central shaft should be at least twice and preferably about four times smaller than the output torque of the circumferential shaft, in order to prevent possible breakage of the allen wrench. One of the accomplishments of the present invention is that this optimum ratio of output torques is achievable.

In the presently preferred embodiment of the invention only one planetary gear stage is used. The rotation rate of ring gear 42, 48, is selected to be 1:3 relative to the rotation rate of input drive gear 32. The rotation rate of first output gear 40 is selected as 1:4 relative to the rotation rate of input drive gear 32. Thus the rotation rate of first output gear 40 relative to ring gear 42, 48, is 3:4. The gears 40 and 64 are given an equal number of teeth so that the ratio of gear 64 to gear 40 is 1:1. The ratio of gear teeth and hence the rate of rotation of drive gear 57 relative to ring gear 42, 48, is 3:1. The rate of rotation of the circumferential output shaft 60 relative to the central output shaft 55 is therefore 1:4. Because of the gear ratios thus selected, the output torque drivingly applied to the circumferential shaft 60 and box wrench 66 is four times that which is applied to the central output shaft 55 and allen wrench 59. This works well in the typical situation. Thus in the preferred embodiment of the invention the output torque of the allen wrench 59 is selected as four times smaller than that of the box wrench 66.

In the illustration of FIG. 2 the gear 64 is provided with about three times as many teeth as the gear 40 so that the difference between torques is even greater than that described above. This gear ratio is preferred for some applications of the tool.

MODULAR CONSTRUCTION

Referring still to FIG. 2, it will be seen that the tool of the present invention is arranged for convenient modular assembly and disassembly. Thus in the housing 10′ the main housing portion 11′, pistol grip 12, and forward housing portion 13′, 14′ are all constructed as an integral unit. Housing portion 15′ is easily removable from housing portion 14′, and housing front cover 70 is easily removable from housing portion 15′. Shaft 55 is made in two longitudinal sections and its hollow forward portion is threaded into the rearward portion. And box wrench 66 has a threaded rearward end which is threaded into the shaft 60. These features of construction facilitate easy assembly of the tool during manufacture, as well as easy disassembly in the event repairs are required.

While the invention has presently been illustrated using spur gears to transfer power from the differential mechanism to the output shafts, bevel gears may be used if so desired. It is then not necessary for the laterally offset axis 21 to be precisely parallel to the axis 20.

EMBODIMENT OF FIG. 4

FIG. 4 shows an alternate form of the invention in which the housing 10″ has no pistol grip. This modification presents no problem to the operator because the reaction torque is totally absorbed inside the tool engaged with a fastener.

OPERATION (FIG. 3)

In the machine of the present invention, when the wrenches on the two output shafts are correspondingly engaged with the bolt and the nut of a fastener the housing 10 provides a closed system within which the forces are balanced. No external forces are either received or exerted by the system, and when rotary power is applied between the housing and the power input shaft an operator holding the housing experiences no reaction torque. This relationship is now described with reference to FIG. 3.

The rotating mechanisms which are coaxial with the main axis of rotation 25 are all supported for rotation relative to housing 10 by means of bearings 44 that support the smooth outer cylindrical surface portion of the ring gear 42, 48, and the bearings 39 that support the shaft 38. The rotating mechanisms which are coaxial with the lateral axis of rotation 50 are all supported for rotation relative to housing 10 by means of bearings 56 that support the inner end of central shaft 55 relative to the housing crank portion 14′, 15′. FIG. 3 indicates schematically that lower rotating parts concentric to axis 25 are supported from housing 10 by bearings 44, while upper rotating parts concentric to axis 50 are supported from housing 10 by bearings 56.

As shown in FIG. 3 a driving torque T1 is applied to the power input shaft 24 and the input gear 32 which tends to rotate that gear in a counterclockwise direction. The rotation of gear 32 causes the planetary gear system 34, 36, 38, to also rotate in a counterclockwise direction, thus inducing a reaction torque T2 from the tightening fastener in the clockwise direction. Since the planetary gear system operates in a well known manner to produce a reversed rotation of the ring gear 42, causing it to rotate in the clockwise direction, a reaction torque T3 is also induced in the ring gear, which is in the counterclockwise direction.

The driving torque applied to central output shaft 55 is counterclockwise, inducing a clockwise reaction torque as shown by arrow T5. Circumferential output shaft 60 is driven in clockwise rotation and its reaction torque from the fastener is counterclockwise as shown by arrow T4. The reaction torques T4 and T5 are opposite but not equal.

A fundamental law of the differential mechanism is that the algebraic sum of all of the torques T1, T2, and T3 about axis 25 is at all times equal to zero. The driving force induced by a power agent (such as compressed air, magnetic field, etc.) acts between the rotor and the stator or housing, creating equal and opposite torques T1 and T6.

Thus, the net of reaction torques is rotationally counterbalanced by the torque T1 exerted by the input shaft 24 (the rotor of the primary driver). The torque T1 produces at the same time a torque (the so called "reaction of the wheel") of the same magnitude around axis 50, laterally applied through the shaft 38, bearings 39, crank-shaped portion 14′ of the housing 10 and bearings 56 to the shaft 55, thus tending to rotate the whole tool counterclockwise around the axis 50 (because the shaft 55 is laterally supported by the fastener secured to the work and hence laterally unmoveable). The above tendency is counterbalanced by the equal and opposite torque T6 of the stator or housing which also is laterally supported by the fastener through the shaft 55 and bearings 56. The result then is that all of the driving and reaction torques in the system are dynamically balanced, having an algebraic sum that is always equal to zero.

It should be mentioned that the given design is intended to be used either with fasteners that have their own "torque-off" feature or by being adjusted by energy input control to produce a predetermined maximum torque. An installation of a torque control unit at any place within the mechanism will expand the field of application of the invention.

EMBODIMENT PREFERRED FOR A SPECIAL SITUATION

In a typical situation the nut turns fairly easily on the bolt, prior to engaging the work piece itself, while the bolt encounters a considerable amount of friction to restrain it from rotating within the hole. In such a typical situation the present invention works very well, in the manner described above.

In certain special situations, however, it is rather easy to turn the bolt in the hole but not very easy to turn the nut on the bolt. This is true, for example, for certain high performance fasteners where the friction of the nut upon the bolt is deliberately made high in order to resist being loosened by vibration or the like. If the reaction torque generated by the nut from the bolt is greater than that generated by the bolt from the hole, the invention as heretofore described will not work. Instead, the rotation of the nut will carry the bolt in rotation with it, both output shafts will rotate in synchronism, and free run of the nut along the bolt will not be achieved.

According to the invention this problem is solved very simply. The bearings 56 instead of being just ball bearings are also selected to incorporate an overrunning or one-way clutch such that spur gear 57, central output shaft 55, and allen wrench 59 may rotate in the counter-clockwise direction, but not in the clockwise direction. The resulting operation then is that the output shaft 55, the allen wrench 59, and the bolt are not rotating. The input spur gear 64 then drives the circumferential shaft 60, box wrench 66, and the nut in clockwise rotation driving the nut along the bolt until a considerable amount of tightening action has been achieved. The mounting friction between the bolt and the work piece then induces a greater reaction torque from the nut, which is reflected back through the system and the differential mechanism so as to induce a reaction torque T5 in the clockwise direction from the allen wrench 59, precisely as it was described in the OPERATION paragraph, above.

While presently preferred embodiments of the invention have been described in detail in order to comply with the patent laws, many variations therefrom are possible as will be readily understood by those skilled in the art. The scope of the invention is therefore to be measured only in accordance with the appended claims.

What I claim is:

1. In a hand operated rotary power tool having a housing, a mechanism for counteracting reaction torque that would otherwise be exhibited directly on the housing, said mechanism comprising:

a powered rotor rotatable on a defined axis with respect to the housing;

a planetary differential mechanism including a ring gear rotatably supported from the housing, a sun gear rotatably supported from the housing being coaxial with said rotor, and a set of planetary gears coacting with both said sun gear and said ring gear, said sun gear being rotatably driven by said rotor;

an output coaxial with both said rotor and said sun gear and drivingly coupled to said set of planetary gears so as to be rotatably driven thereby;

a shaft rotatably supported from the housing on an axis that is laterally offset from the axis of said rotor, said ring gear being drivingly coupled to said laterally offset shaft; and means for inhibiting rotation of said laterally offset shaft relative to the housing in the direction that said output rotates relative to the housing.

2. A reaction torque counteraction mechanism as in claim 1 wherein said inhibiting means includes bearing means providing rotatable support for said laterally offset shaft and including a one-way clutch.

3. A reaction torque counteraction mechanism as in claim 1 wherein said ring gear has gear teeth which drivingly engage with teeth carried by said laterally offset shaft.

4. A reaction torque counteraction mechanism as in claim 3 wherein said ring gear teeth which drivingly engage with said gear teeth of said laterally offset shaft are external teeth.

5. A reaction torque counteraction mechanism as in claim 1 which includes a drive motor having a stator rigidly affixed to said housing.

6. A reaction torque counteraction mechanism as in claim 1 wherein the torque ratio of the said ring gear to the said laterally offset shaft is greater than 1:1.

7. A reaction torque counteraction mechanism as in claim 2 wherein said ring gear has gear teeth which drivingly engage with teeth carried by said laterally offset shaft.

8. A reaction torque counteraction mechanism as in claim 2 which includes a drive motor having a stator rigidly affixed to said housing.

9. A reaction torque counteraction mechanism as in claim 2 wherein the torque ratio of the said ring gear to the said laterally offset shaft is greater than 1:1.

10. A reaction torque counteraction mechanism as in claim 3 which includes a drive motor having a stator rigidly affixed to said housing.

11. A reaction torque counteraction mechanism as in claim 3 wherein the torque ratio of the said ring gear to the said laterally offset shaft is greater than 1:1.

12. A reaction torque counteraction mechanism as in claim 10 wherein the torque ratio of the said ring gear to the said laterally offset shaft is greater than 1:1.

13. In a powered hand-held rotary tool which consists of a housing, a rotor adapted to be driven for rotation relative to the housing, and a planetary differential mechanism having a sun gear coaxial with and driven from the rotor, planetary gears, and a ring gear; mechanism for counteracting reaction torque of the housing that would otherwise be externally manifested, said reaction torque counteraction mechanism comprising:

an output coaxial with the sun gear and rotatably driven by the planetary gears;

means supporting the ring gear for rotation relative to the housing;

a shaft rotatably supported from the housing on an axis that is laterally offset from the axis of the rotor;

the ring gear being drivingly coupled to said laterally offset shaft; and means for inhibiting the rotation of said laterally offset shaft relative to said housing in the direction that said output rotates relative to said housing.

14. Reaction torque counteraction mechanism as in claim 13 wherein said means for inhibiting the rotation of said laterally offset shaft relative to said housing includes bearing means supporting said laterally offset shaft, said bearing means including a one-way clutch.

15. Reaction torque counteraction mechanism as in claim 13 wherein said ring gear has gear teeth which drivingly engage with teeth carried by said laterally offset shaft.

16. Reaction torque counteraction mechanism as in claim 15 wherein said ring gear teeth which drivingly engage with said gear teeth of said laterally offset shaft are external teeth.

17. A reaction torque counteraction mechanism as in claim 13 wherein the torque ratio of the said ring gear to the said laterally offset shaft is greater than 1:1.

* * * * *